United States Patent [19]
Morioka et al.

[11] Patent Number: 5,614,803
[45] Date of Patent: Mar. 25, 1997

[54] INVERTER CONTROL APPARATUS

[75] Inventors: Tatsuru Morioka, Okazaki; Tsuneyuki Egami, Gamagori, both of Japan

[73] Assignee: Nippondenso Co., Ltd., Kariya, Japan

[21] Appl. No.: 493,702

[22] Filed: Jun. 22, 1995

[30] Foreign Application Priority Data

Jul. 5, 1994 [JP] Japan .................................. 6-153875

[51] Int. Cl.⁶ .................................................... H02D 5/28
[52] U.S. Cl. ............................ 318/801; 318/809; 318/590
[58] Field of Search ............................ 318/599, 798–811, 318/696, 685, 590, 594

[56] References Cited

U.S. PATENT DOCUMENTS

| | | | |
|---|---|---|---|
| 4,467,262 | 8/1984 | Curtiss | 318/811 |
| 4,641,075 | 2/1987 | Asano et al. | |
| 4,847,743 | 7/1989 | Kamiyama | |
| 4,904,919 | 2/1990 | McNaughton | 318/811 |
| 4,926,104 | 5/1990 | King et al. | 318/599 |

FOREIGN PATENT DOCUMENTS

| | | |
|---|---|---|
| 9200006.1 | 6/1992 | Germany . |
| 5-56649 | 3/1993 | Japan . |
| 6233549 | 8/1994 | Japan . |

*Primary Examiner*—John W. Cabeca
*Attorney, Agent, or Firm*—Cushman, Darby & Cushman, IP Group of Pillsbury Madison & Sutro LLP

[57] ABSTRACT

In order to reduce distortion of a real-current wave form and to suppress substantial transient fluctuation of the current and torque during changeover from a regeneration running condition to the power running condition of a three-phase induction motor, changeover from the three-phase-modulation control to the two-phase-modulation control is carried out at the same time the power running condition of the motor is changed to the regeneration running condition according to the motor-state-quantum such as a detected slip ratio, detected torque, detected current or the like. Thus, distortion of the motor-current wave form is reduced and significant fluctuation of the motor-current and torque during the changeover is reduced.

10 Claims, 10 Drawing Sheets

FIG. 3
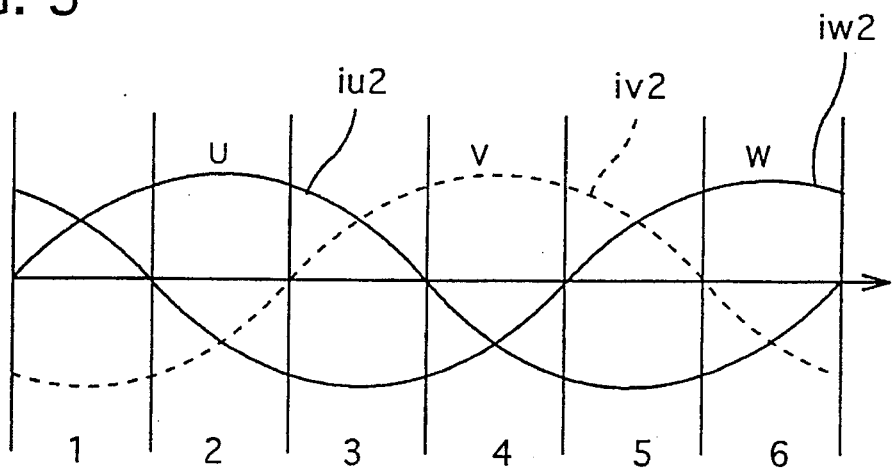
FIG. 4
| MODE | SU | SV | SW |
|------|----|----|----|
| 1 | 0 | 1 | 0 |
| 2 | 0 | 1 | 1 |
| 3 | 0 | 0 | 1 |
| 4 | 1 | 0 | 1 |
| 5 | 1 | 0 | 0 |
| 6 | 1 | 1 | 0 |
| 0 | 0 | 0 | 0 |
FIG. 5
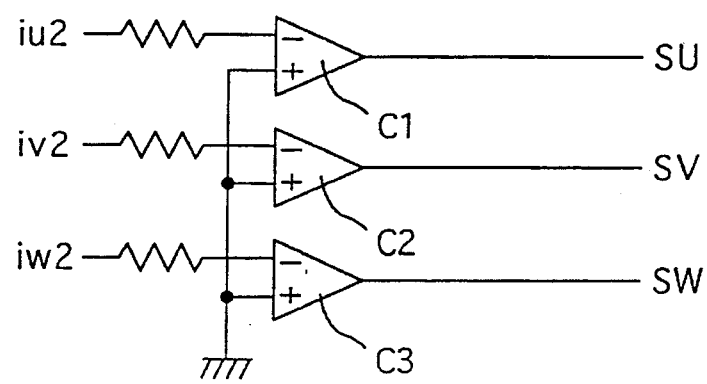

| MODE | CODE SIGNAL | SHIFT VALUE |
|---|---|---|
| 1 | 010 | Sv + Vp |
| 2 | 011 | Su + (−Vp) |
| 3 | 001 | Sw + Vp |
| 4 | 101 | Sv + (−Vp) |
| 5 | 100 | Su + Vp |
| 6 | 110 | Sw + (−Vp) |
| 0 | 000 | 0 (Vm) |

INVERTER CONTROL APPARATUS

CROSS REFERENCE TO RELATED APPLICATION

The present application is based on and claims priority from Japanese Patent Application Hei 6-153875 filed on Jul. 5, 1994, the contents of which are incorporated herein by reference.

BACKGROUND OF THE INVENTION

1. Field of the Invention

The present invention relates to an inverter control apparatus for driving a three-phase induction motor, and more particularly, to an inverter control apparatus which changes between two-phase-modulation, in which peak values of three-phase-voltages of an inverter are fixed, and three-phase-modulation.

2. Description of the Related Art

U.S. Pat. No. 4,641,075 proposes a PWM (pulse-width modulation) control apparatus (hereinafter referred to as the inverter control apparatus) for a three-phase inverter, in which a two-phase-modulation is adopted to reduce electromagnetic-wave noise and switching-power-loss and to improve the power-conversion-efficiency. The two-phase-modulation fixes one phase-voltage out of three phase voltage of an inverter to a certain level in sequence and modulates other two phase voltages.

U.S. Pat. No. 4,847,743 proposes a device to change over from the above two-phase-modulation to the three-phase-modulation or vice-versa. The two-phase-modulation is changed over to the three-phase-modulation when a voltage-vector-command-signal (which corresponds to an amplitude of the inverter-output-voltage) becomes less than a predetermined value. In the three-phase-modulation of the inverter control apparatus, the PWM-control is carried at according to a difference between a set-current-signal and detected or real motor-current (e.g., PI (proportional and integrated) processing of deviation) to provide three-phase alternating voltages, which is applied to a three-phase induction motor. The two-phase-modulation fixes each phase-voltage of the inverter to a certain value at a certain phase-angle of the set-current-signal (sinusoidal wave).

The above mentioned two-phase-modulation is effective to reduce the magnetic noise and switching power loss, and also improve the efficiency of the power conversion. However, it has the following problems.

That is, the conventional two-phase-modulation fixes each phase-voltage during a certain phase-angle range of the set-current-signal, which is a sinusoidal wave signal, to a fixed voltage and controls other unfixed phase-voltages to voltages corresponding to the set-current-signal. To put it more concretely, the current wave, which has an angle range of 360° in a cycle, of the set-current-signal of each phase is divided into 60° phase-intervals so as to include an interval having phase-angles 30° on the left and right from the center of the peak value of the current wave, and the peak value of the set-current-signal in each phase-interval in the positive or the negative direction is fixed as a peak value in the positive or the negative direction, and the rest of the set-current-signals are not fixed but controlled through a minor loop of a motor current feedback circuit.

However, in this case, the current of the set-current-signal of the phase voltage to be fixed increases and the currents of other unfixed phases are controlled, irrespective of the current increase, through a minor current-feedback loop according to a sinusoidal set-current-signal. Accordingly, the fixed phase is caused as if a disturbance is input thereto, thereby changing the set-current-signal more abruptly than that in the three-phase-modulation to distort the motor-current wave.

Japanese Unexamined Patent Publication Hei 6-233549 filed by the same applicant as this application, on the other hand, solves the above problem. In this reference, a deviation between set-current-signal of each phase and a real-current-signal of the corresponding phase is processed through a PI control circuit, which is compared to a triangular wave of a certain frequency by a comparator to generate a PWM signal, which drives an inverter to control the phase voltages applied to a motor. In order to eliminate the distortion of the motor-current, an offset value that is necessary to fix a phase voltage is added to or subtracted from the triangular wave corresponding to the phase to be fixed and also a certain offset value is added to or subtracted from the triangular waves corresponding to other unfixed phases.

However, since the motor-current is feedback-controlled according to a set-current-signal and a phase voltage to be applied to the motor is determined according to a deviation between the set-current-signal and the real motor-current, there is a phase difference between the set-current-signal and the phase voltage to be applied to the same phase. As a result, if the above fixing is carried at a phase angle where the absolute value of the set-current-signal becomes a peak value, the phase angle is fixed where the absolute value of the phase voltage is not its peak, and since the offset value, which is added or subtracted to or from the fixed phase, is added to or subtracted from the unfixed phases so that the modulation percentage exceeds 100%, the phase voltage to be applied to the motor and motor-current is distorted.

The cause and effect of the distortion of the phase voltage wave in the motor operation is described next.

The three-phase induction motor operates as a ordinary electric motor which is referred to as the power running condition and also operates as a generator which is referred to as the regeneration" running condition. FIG. 14 is a vector diagram in which the phase voltage vector and the phase current vectors are plotted in the d-q coordinates, and FIG. 15 is a vector diagram showing the relationship between the above vectors in the "regeneration running condition.

In FIG. 14 and FIG. 15, a reference character $\Phi 0$ indicates an exciting-magnetic-flux-vector component of the rotating-field-magnetic-flux-vector, extending in the same direction as the d axis. A reference character E0 is a voltage vector induced in the motor coil by the exciting magnetic-flux-vector $\Phi 0$ ahead of the exciting magnetic-flux-vector by a phase angle 90°. A reference character I indicates a current vector of the motor coil, Id indicates an exciting-current-vector component of the current vector I, Iq indicates a torque-current component of the current vector, R indicates a motor coil resistance, L indicates a motor coil inductance, and RI is a voltage drop across a resistor having a resistance R when the current I flows therethrough in the same phase as the current vector I. RId is a d-axis component of the voltage drop vector RI, RIq is a q-axis component of the voltage drop vector RI, $\omega$ is an angular velocity of the current vector I, $\omega LI$ is a voltage drop vector across the motor coil having an inductance L, and $\omega LIq$ is a q-axis component of the voltage drop vector $\omega LI$ and is generated when the q-axis component of the current vector I flows through the motor coil having its inductance L at a phase angle 90° ahead of the torque current component Iq. ωLId is a d-axis component of the voltage drop component ωLI and is generated when the d-axis component and the exciting current Id of the current vector I flows through the motor coil having its inductance L at a phase angle 90° ahead of the exciting current Id. Reference character V indicates a voltage vector applied to the motor coil, which is a resultant of a voltage vector E0, the voltage drop vector R1 and the voltage drop vector ωLI.

In the power running condition shown in FIG. 14, the voltage vector V advances by a phase angle θ ahead of the current vector I. However, in the regeneration running condition shown in FIG. 15, since the torque generated in the motor becomes negative and the torque current component Iq points the negative direction of the q axis, the advancing phase angle θ of the voltage vector V ahead of the current vector I becomes significant. The current vector I at this moment is controlled to be equal to the set-current-signal by a current-feedback-control loop so that the advancing phase angle of the voltage vector V relative to the set-current-signal becomes equal to the angle θ. As a result, the phase difference in the regeneration running condition becomes greater than that in the power running condition in the above described fixing mode, thereby distorting of the phase voltage in the regeneration running condition much more than in the power running condition.

As described above, the three-phase-modulation mode is more desirable during the regeneration running condition of the three-phase induction motor, and the two-phase-modulation is more desirable during the power running condition thereof.

However, since the changeover between the three-phase-modulation and the two-phase-modulation is carried according to the set-current-signal in the above described conventional apparatus, when the regeneration running condition is changed over to the power running condition, the real-current-signal or the detected current retards relative to the phase voltage corresponding to the set-current-signal and the detected current becomes a value for the changeover from the regeneration running condition to the power running condition a certain time after the real changeover. As a result, if the changeover from the regeneration running condition to the power running condition is detected from the change of the set-current-signal, in order to change the three-phase-modulation mode to the two-phase-modulation mode, the two-phase-modulation is still carried still in the regeneration running condition, resulting in significant distortion of the phase voltage, thereby distorting the motor-current and causing vibration of the motor.

SUMMARY OF THE INVENTION

The present invention is intended to solve the above problem and has an object to provide an inverter control apparatus which changes over from the three-phase-modulation to the two-phase-modulation and which reduces the wave distortion of the motor-current, vibration, noise without lowering the efficiency thereof.

Another object of the present invention is to provide an inverter control apparatus which includes a signal generator generating a set-current-signal according to a motor-control-signal; a sensor for detecting real-current-signal; a detector a for detecting the deviation between a set-current-signal and the real motor-current; means for changing the modulation-mode according to a motor-state or to a delayed signal of the motor-control-signal or the set-current-signal between a two-phase-modulation (which sequentially fixes each inverter-phase-voltage to a fixed modulation percentage) and a three-phase-modulation (which does not fix the modulation percentage); and a wave-signal generator for generating two-phase-modulation-waves and three-phase-modulation-waves of each phase-voltage which is applied to the motor.

Another object of the present invention is to provide an inverter control apparatus wherein, in addition to the above mentioned structure the means for changing the modulation mode commands the wave signal generator to change over from the three-phase-modulation to the two-phase-modulation a fixed time after a set-slip-ratio changes from a negative value to a positive value.

A further object of the present invention is to provide an inverter control apparatus wherein instead of the above mentioned means, the means for changing the modulation mode commands the wave signal generator to change over from the three-phase-modulation to the two-phase-modulation a fixed period or fixed time after a set-torque changes from a negative value to a positive value.

A further object of the present invention is to provide an inverter control apparatus, wherein instead of the above-mentioned structures, the means for changing the modulation mode commands the wave signal generator to change over the said three-phase-modulation-mode to the two-phase-modulation a fixed time after the set-current-signal changes from a value corresponding to the regeneration running condition to a value corresponding to the power running condition.

A further object of the present invention is to provide an inverter control apparatus, wherein instead of the above-mentioned structures, the means for changing the modulation mode commands the wave signal generator to change over the three-phase-modulation-mode to the two-phase-modulation a fixed time after a real torque changes from a negative value to a positive value.

A further object of the present invention is to provide an inverter control, wherein instead of the above-mentioned structures, the means for changing the modulation mode commands the wave signal generator to change over the three-phase-modulation-mode to the two-phase-modulation a fixed time after a charging current of battery changes to a discharging current.

A further object of the present invention is to provide an inverter control apparatus, wherein in addition to the above-mentioned structure, the wave-signal generator adds or subtracts a fixed offset value to or from the deviation of a phase to be fixed when the two-phase-modulation is selected and adds or subtracts a fixed offset value to or from the deviation of a phase not to be fixed.

A further object of the present invention is to provide an inverter control apparatus, wherein in addition to the above-mentioned structure, the wave-signal generator includes PWM carrier-wave-generator and a comparator which compares a PWM-carrier-wave and the deviation.

According to the above structures, when the motor-state-quantum, such as a detected value relative to the motor, particularly when the changeover from the regeneration running condition to the power running condition is used, the time of the changeover from the regeneration running condition to the power running condition is detected. As a result, the distortion of the motor-current during the regeneration running can be suppressed while taking advantage of the two-phase-modulation, and various problems caused by the increased distortion of the current-wave, such as the vibration, decrease of the efficiency or increase of noise, can be suppressed.

Because the changeover is carried according to a delayed motor-control-signal or set-current-signal, the modulation mode changes a certain delay time after the changeover from the regeneration running condition to the power running condition is commanded, and, therefore, the real-changeover from the regeneration running condition to the power running operation is carried at the same delay time after the command is given effectively as in the above.

In addition to the above operation, the changeover from the three-phase-modulation to the two-phase-modulation is carried a fixed time after a set-slip-ratio 'so' changes from a negative value to a positive value. That is, the time when the real motor-slip-ratio 's' becomes 0 is the time of changeover from the electricity generation to the motor drive. Since the real motor-slip-ratio 's' becomes 0 a certain time after the set-slip-ratio 'so' becomes 0, if a motor-control-signal is generated at this time after the set-slip-ratio becomes 0, the changeover of the modulation-mode can be carried out just when the operation of the motor is changed over from the electricity generation mode to the motor drive mode.

Instead of the above operations, the changeover from the three-phase-modulation to the two-phase-modulation is carried a fixed time after a set-torque changes from a negative value to a positive value. Substantially the same effect as the second structure is expected in this case. Instead of the above operations, the changeover from the three-phase-modulation to the two-phase-modulation is carried a fixed time after the set-current-signal changes from a value for the motor drive mode to a value for the electricity generation mode.

Instead of the above operations, the changeover from the three-phase-modulation to the two-phase-modulation is carried out when a detected torque changes from a negative value (regeneration running) to a positive value (power running). Therefore, accurate changeover from the electricity generation mode to the motor drive mode can be expected.

Instead of the above operation of the first structure, the changeover from the three-phase-modulation to the two-phase-modulation is carried when the battery current changes from a charging current to a discharging current. As a result, the modulation mode can be changed accurately when the electricity generation mode is changed over to the motor drive mode.

In addition to the above operations, a fixed offset value is added to or subtracted from the deviation in the phase to be fixed during the two-phase-modulation. Since the same offset value is applied to the deviations of all the phases, the deviation between phases can be decreased effectively although the offset value causes distortions of the phase voltages.

In addition to the above operations, since the wave generator includes a PWM carrier-wave-generator and a comparator, a simple structure for the two-phase-modulation is provided.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 3 is a current wave form chart showing phase-voltage periods 1 through 6 set for fixing phase-voltages according to set-current-signals iu, iv and iw;

FIG. 4 is a logical state chart which indicates the amplitude of the set-current signals iu, iv and iw by three-bit-binary numbers SU, SV and SW;

FIG. 5 is a circuit diagram of a phase detector 2 according to a first embodiment of the present invention, which generates the three-bit-binary numbers SU, SV and SW shown in FIG. 4;

DETAILED DESCRIPTION OF THE PREFERRED EMBODIMENT

Preferred embodiment according to the present invention will now be described with reference to the appended drawings.

An inverter control apparatus for a three-phase induction motor according to a first embodiment of the present invention, which drives an electric motor car, will be described with reference to FIG. 1.

Figure 2:
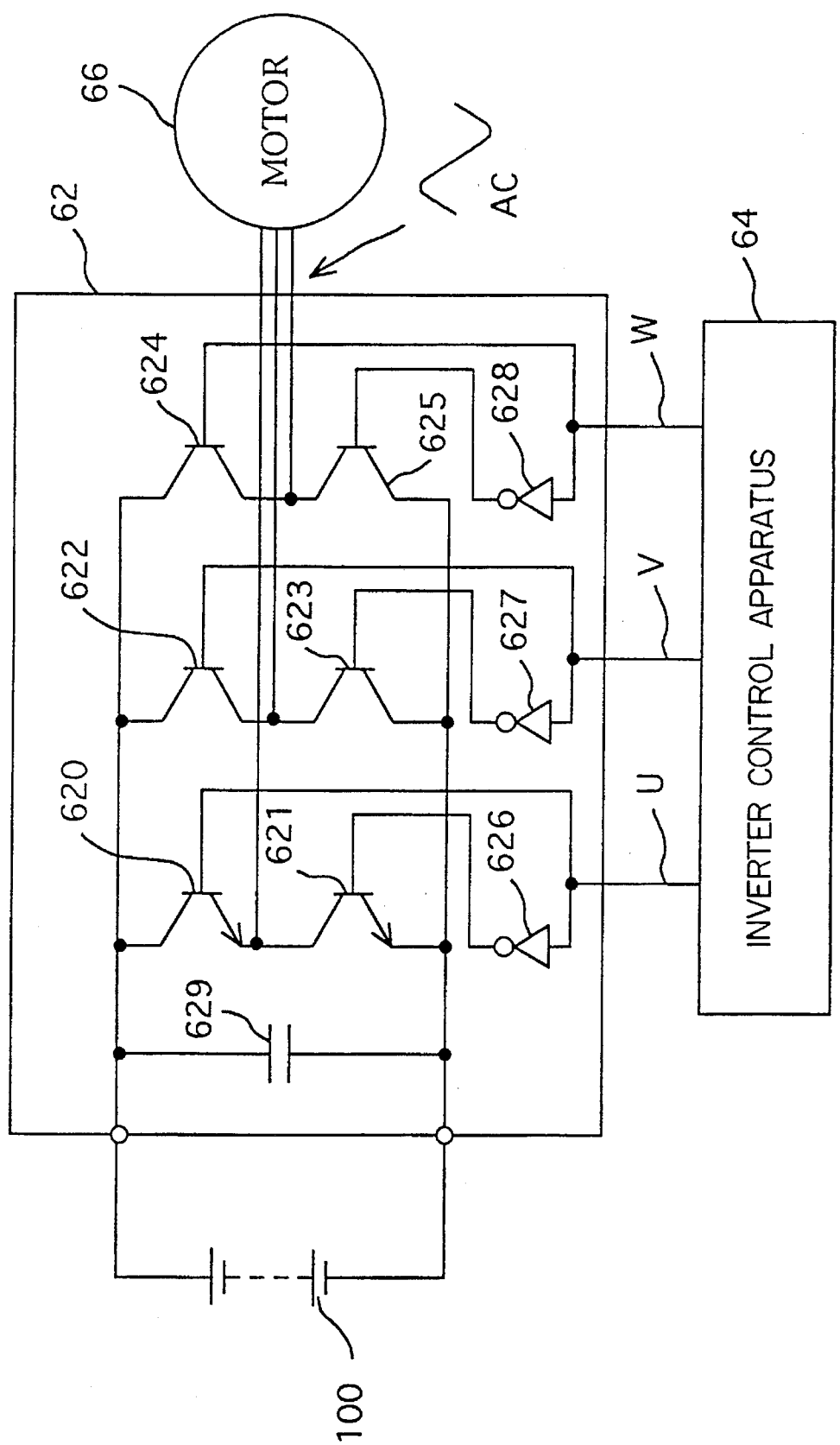
FIG. 2 is an example of the circuit diagram of the inverter shown in FIG. 1.

An inverter 62 is composed of six transistors (IGBT) as switching elements 620 through 625 as shown in FIG. 2, three not-logic-elements 626 through 628 and a smoothing capacitor 629, and is controlled by respective phase-control-signals U, V and W generated by an inverter control apparatus 64. The wave-forms of respective phase-control-signals U, V and W are formed by controlling the duty ratio (pulse width/pulse cycle) of a pulse signal having a prescribed carrier frequency.

An example of the inverter control apparatus 64 is explained with reference to FIG. 1.

A reference numeral 11 is a U-phase deviation calculator which calculates a deviation between a U-phase set-current-signal iu generated by a controller 10 and a real-current-signal (detected current) iu' detected by a current sensor 8, and a reference numeral 13 indicates likewise a W-phase deviation calculator which calculates a deviation between a W-phase set-current-signal iw and a real-current-signal iw' detected by a current sensor 8.

A reference numeral 21 is a U-phase PI processing unit which processes the deviation calculated by the U-phase deviation calculator 11 and generates a U-phase signal voltage Su. A reference numeral 23 indicates a W-phase PI processing unit which processes the deviation calculated by the W-phase deviation calculator 13 and generates a W-phase signal voltage Sw. A V-phase signal voltage Sv applied to the V-phase is given by a inverting adder 29 which adds the U-phase signal voltage Su and W-phase signal voltage Sw and inverts the sum thereof.

Thus, the deviations between the U-phase and the W-phase set-current-signals iu and iw and the real-motor currents iu' and iw' are calculated respectively and are subsequently PI-amplified to form U-phase and W-phase signal voltages, which are inverted and added together to form the V-phase signal voltage Sv. These three-phase signal voltages Su, Sv and Sw are respectively applied to input terminals of comparators 31, 32 and 33. On the other hand, a voltage is applied from an adder 6 to the plus-pole input terminals of the comparator 31, 32 and 33 to PWM-modulate the three-phase signals as described later. PWM-signal voltages having prescribed duty ratios are generated by the comparators 31, 32 and 33, and are applied to the three-phase inverter 62 through a gate driving circuit 34. Then, the inverter 62 PWM-controls input voltages of the motor 66.

The controller 10 generates the set-current-signals iu and iw which are sinusoidal voltages having frequencies and amplitudes changeable according to vehicle running conditions, accelerator pedal position and rotational speed of a motor 66. The set current signals iu and iw have phase-angles 120° different from each other.

A triangular-wave-voltage-generating-circuit 5 generates a triangular-wave-voltage (or saw tooth wave voltage) T having a fixed frequency. The adder 6 adds the triangular-wave-voltage T and an offset value OFV (which is explained later) and applies the sum to the plus input terminals of the comparators 31 through 33.

An amplifier 9 amplifies current signals which correspond to real currents of the U-phase and W-phase detected by the current sensor 8 to an amplitude sufficient to be compared with the set-current signals iu and iw.

An adder 50 adds the set-current-signals iu and iw, inverts the sum thereof and generates a set-current-signal iv. These set-current signals iu, iv and iw are sent to a phase-detector 2, which detects present phase-period and applies three-bit-phase-identification-signals SU, SV and SW through a modulation switch 20 to a multiplexer 3. The multiplexer 3 sets each period during which a voltage of each phase is fixed in sequence.

In this embodiment, each set-current-signal voltage is compared with the 0-level voltage and given a binary number 0 when it is plus and binary number 1 when it is minus. As a result, the states of the set-current-signals iu, iv and iw during one cycle are divided into six modes as shown in FIG. 3 and FIG. 4, where the states are indicated by three-bit binary numbers. The phase detector 2, which generates the three-bit binary numbers, is composed of simple comparators C1, C2 and C3 as shown in FIG. 5.

Another mode indicated by binary numbers 0, 0 and 0 which correspond respectively to the three bit signals SU, SV and SW detected by the phase-detector 2 is added to the six modes to make seven modes in total. An operation of selecting one of the three-phase-voltages U, V and W from anyone of the modes 1 through 6 and fixing each peak value is explained next.

In this embodiment, an offset voltage OFV of the triangular voltage T to be compared with the three-phase signal voltages Su, Sv and Sw is changed to fix the voltage or carry the two-phase-modulation, which is explained next.

Figure 6A:
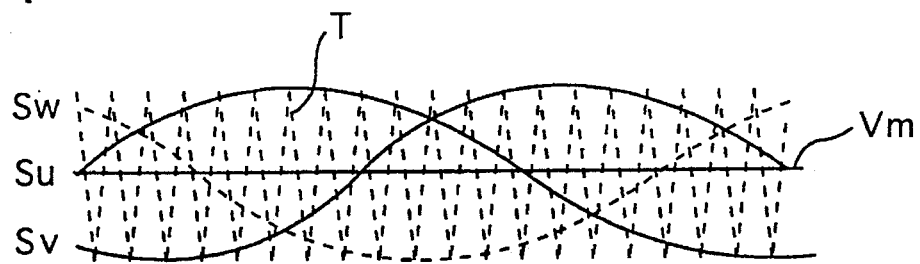
FIGS. 6A and 6B are timing charts showing current-wave-forms in PWM-modulation of signal voltages Su, Sv and Sw by a triangular wave voltage T when the offset voltage OFT of comparators shown in FIG. 1 is 0 level (Vm level)
Figure 6B:
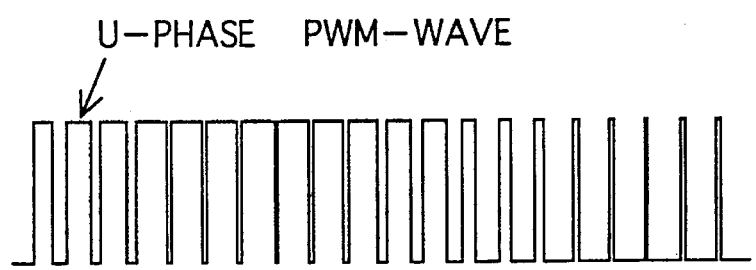
Figure 7:
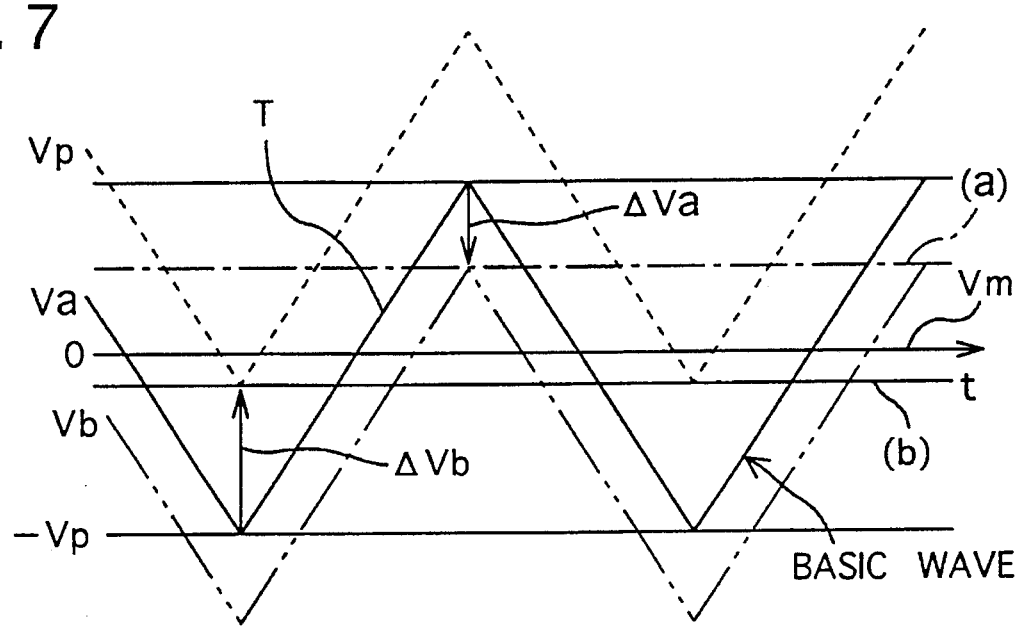
FIG. 7 is a timing chart showing a wave form of the triangular wave voltage T, to which an offset is applied when the offset voltage OFT of the comparators is 0 level (Vm level) as in FIGS. 6A and 6B.

As shown in FIGS. 6A and 6B, each set-current-signal and the triangular signal (indicated by a dotted line in FIG. 6A) are compared to generate a PWM wave as in the known three-phase-modulation. FIG. 7 is a partially enlarged view of FIG. 6A. The output voltage Su of the U-phase-PI-processing unit 21 is roughly assumed to become a one-dot-chain line (a). In order to fix the duty ratio of the PWM signal to 100% to carry the two-phase-modulation, the positive peak value of the triangular wave (the output of the adder 6 in FIG. 1) has to become Va. If a shift value is ΔVa, it is given by the following equation, wherein Vp is the positive peak value of the triangular wave T and -Vp is the negative peak value thereof.

$$\Delta Va = Va - Vp = Va + (-Vp)$$

That is, the shift value ΔVa is given by adding the negative peak value -Vp of the triangular wave T and the output signal Su of the PI-processing unit 21.

When the output signal Su of U-phase PI-processing-unit is indicated by a straight line (b) and its voltage is indicated by Vb, the shift value, in this case ΔVb, is given by the following equation.

$$\Delta Vb = Vb - (-Vp) = Vb + Vp$$

That is, the shift value ΔVb is given by adding the positive peak value Vp of the triangular wave T and the output signal Su of the PI-processing unit 21 (subtraction of a negative value).

Other values can be obtained in the same manner as in the above. The shift values are given by adding the output signal Sv of the adder 29 and the output signal Sw of the PI-processor 23 and negative or positive peak value (Vp or -Vp).

Figure 8:
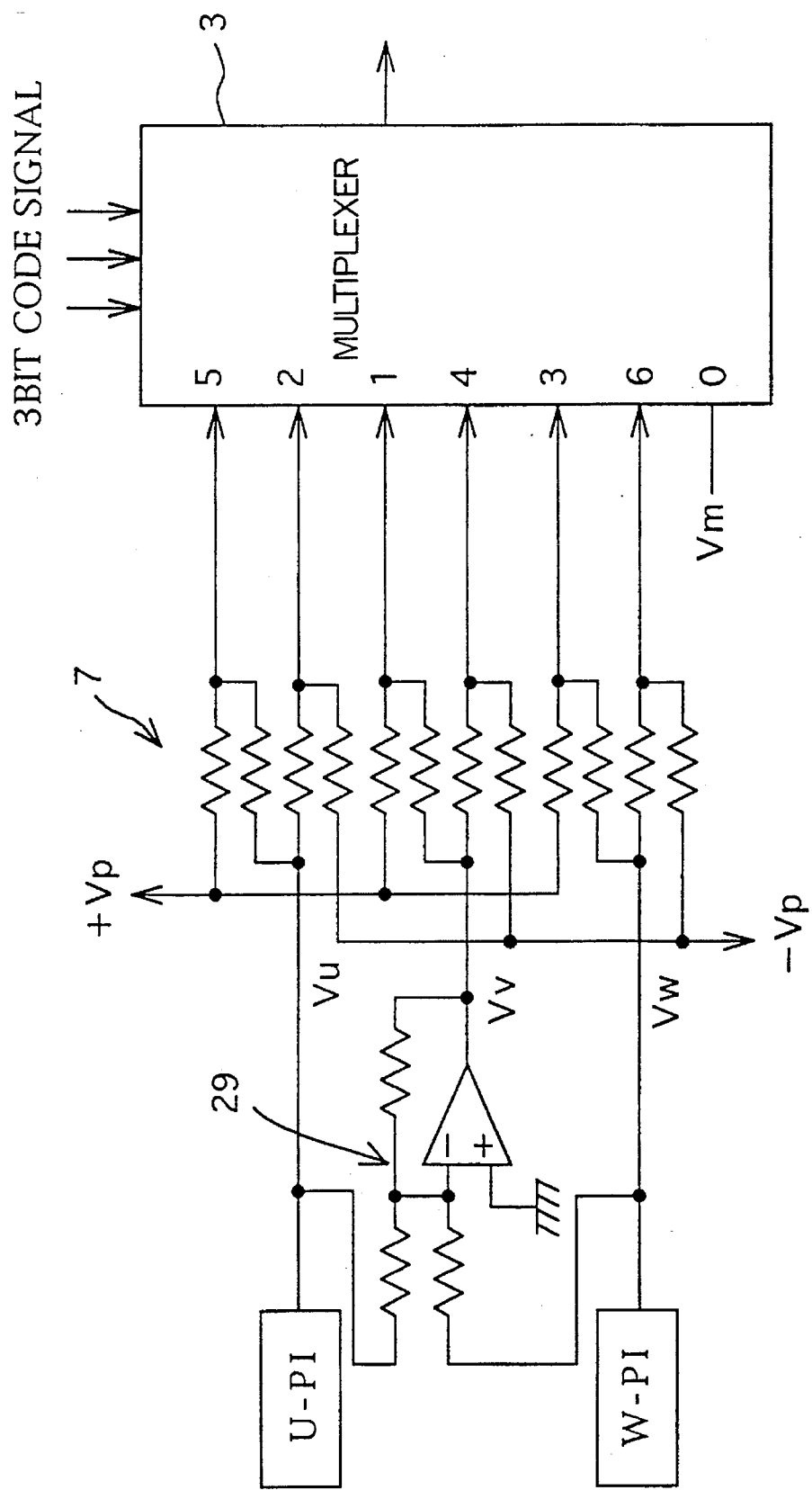
FIG. 8 is a circuit diagram showing an example of the adders shown in FIG. 1.

The adder 7 for the above additions may be composed of simple elements such as resistors as shown in FIG. 8. As described above, shift values for all the six modes are calculated and appropriate values are selected by the multiplexer 3.

Figures 9, 10:
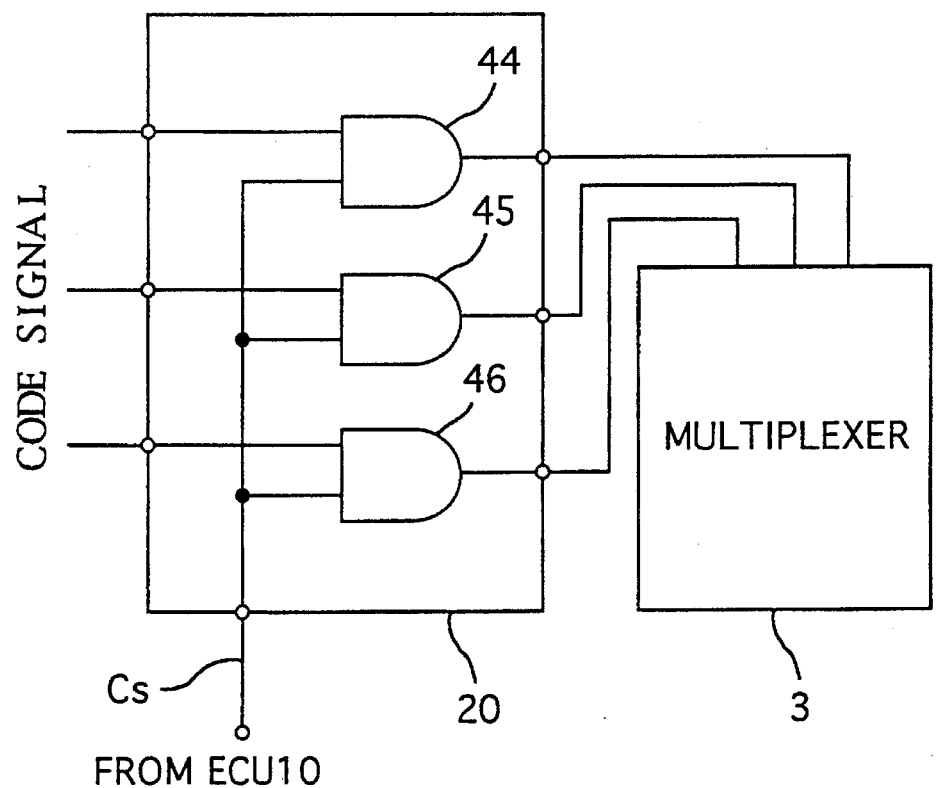
FIG. 9 is an output-mode-chart showing the operation of a multiplexer shown in FIG. 1.
FIG. 10 is a circuit diagram showing an example of a modulation switch shown in FIG. 1.

The shift values for the respective modes are shown in FIG. 9. Input codes in FIG. 9 are the three-bit codes shown in FIG. 4 (which are generated by the phase-detector 2). Each of the codes indicates each one of the modes 1 through 6. The multiplexer 3 selects an appropriate mode. For example, when the mode is [011], the multiplexer 3 selects its input terminal 2 and the shift value becomes Su-Vp.

Figure 1:
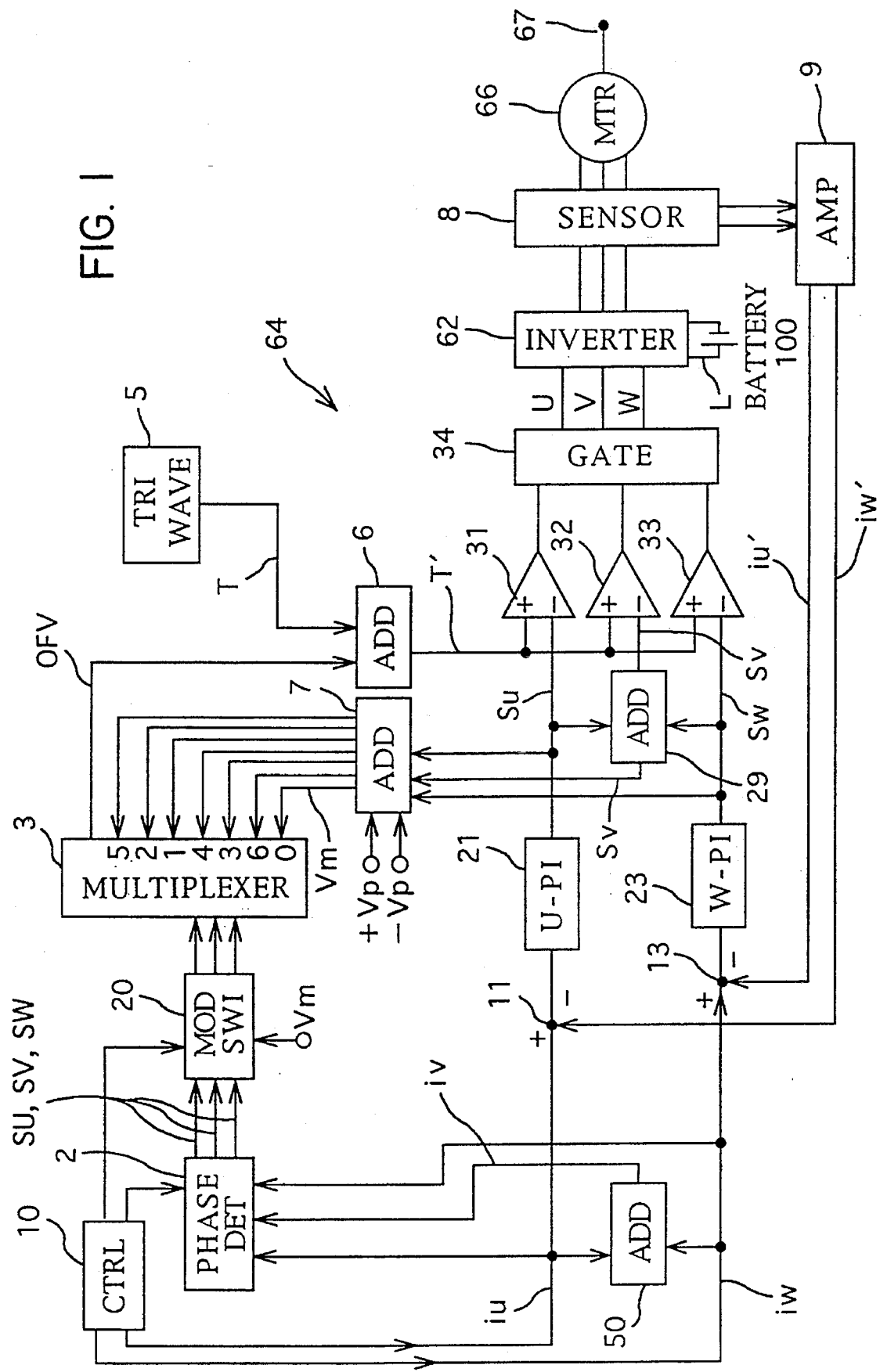
FIG. 1 is a block diagram illustrating an inverter control apparatus according to a first embodiment of the present invention.

The shift value (offset voltage) OFV generated by the multiplexer 3 is applied to the adder 6, which adds this to the triangular voltage T to make a triangular wave voltage T' having an offset (cf. FIG. 1).

The triangular wave T' to which the offset voltage OFV is added is applied to the comparator 31 through 33 (shown in FIG. 1) and compared with the three-phase signal voltages Su, Sv and Sw, thereby providing the duty ratio signal (or PWM-signals).

Thus, the duty ratio of the comparator 32 in the mode 1 is fixed to 0% or a low level, the duty ratio of the comparator 31 in the mode 2 is fixed to 100% or a high level, the duty ratio of the comparator 33 in the mode 3 is fixed to 0% or the low level, the duty ratio of the comparator 32 in the mode 4 is fixed to 100% or the high level, the duty ratio of the comparator 31 in the mode 5 is fixed to 0% or the low level and the duty ratio of the comparator 33 in the mode 6 is fixed to 100% or the high level, thereby providing a two-phase-modulation of six different-voltage-fixed-patterns.

The operation of this apparatus in the three-phase-operation is described next.

In this embodiment, the PWM-wave for the two-phase-modulation is provided by shifting a triangular wave voltage. If the shift value (offset voltage OFV) is 0, there is no difference from the motor control by the PWM-wave-form in an ordinary three-phase-modulation.

In this embodiment, the modulation switch 20 includes three AND circuits 44, 45 and 46, and is disposed at an output side of the phase-detector 2 as shown in FIGS. 1 and 10. The output signal of the phase-detector 2 is applied to one of two input terminals of each of the AND circuits 44, 45 and 46, and modulation-select-signal Cs is applied to the other of each of the input terminals of the AND circuits 44, 45 and 46. If the modulation-select-signal Cs is in the high level, the three-bit code of the phase-detector 2 is sent to the multiplexer 3, and if the modulation-select-signal Cs is in the low level, the three-bit low-level-code-signal [000] is applied to the multiplexer 3.

The multiplexer 3 (shown in FIG. 8) selects a direct-current signal voltage Vm which is applied to the input terminal number 0 when the [000] code signal is applied thereto from the phase-detector 2. The signal voltage Vm is set to be 0-level of the triangular wave voltage T (as shown in FIG. 7). Therefore, the adder 6 sends the triangular wave voltage T to the comparator 31 through 33 without level-shifting, thereby carrying out the three-phase-modulation.

Figure 11:
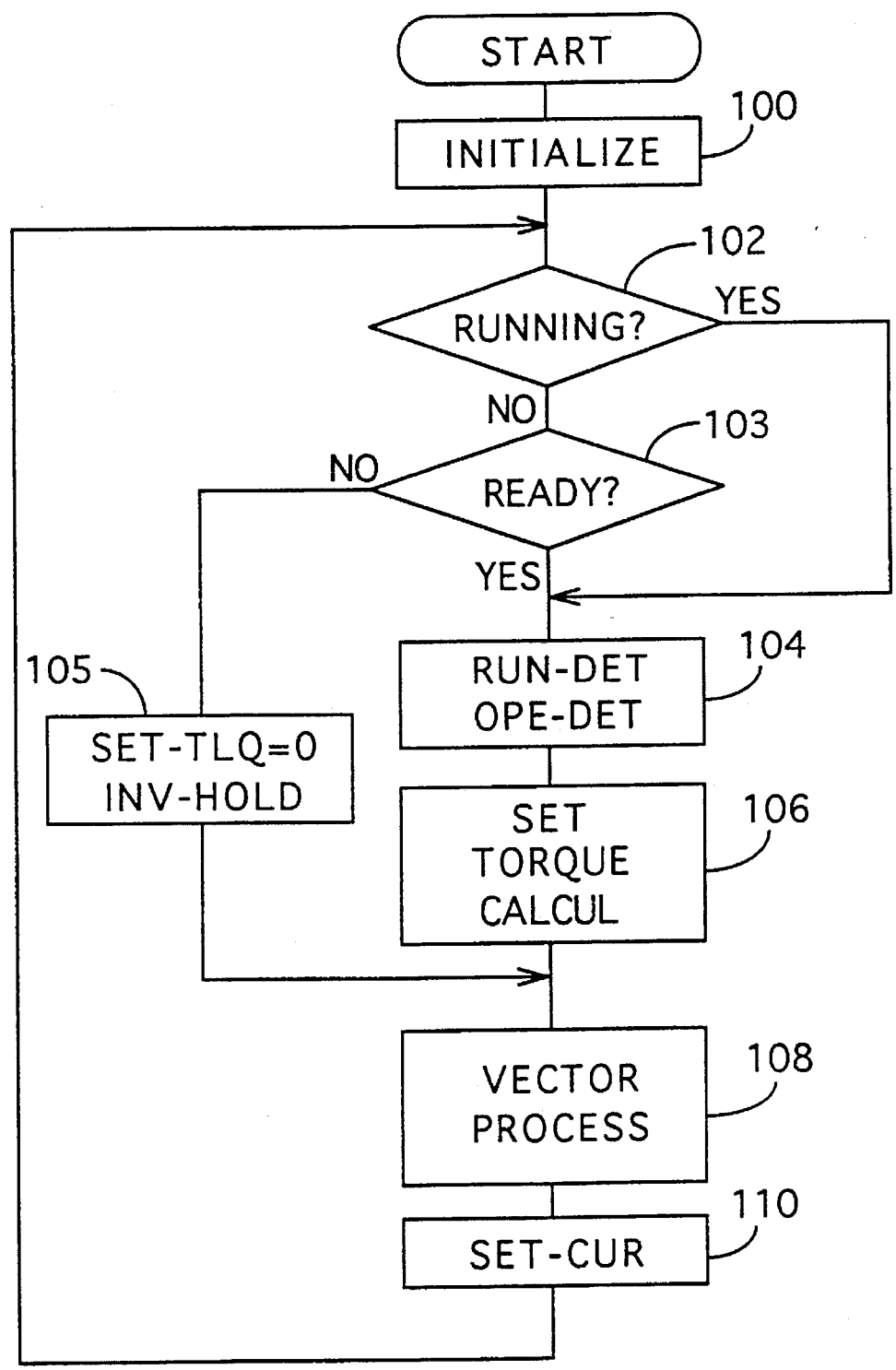
FIG. 11 is a flow chart showing the control steps of a controller shown in FIG. 1.

The control operation of the above apparatus is described with reference to flow charts shown in FIGS. 11 and 12 next.

These flow charts show the motor-control-operation of the controller 10.

As soon as an electric switch is turned on, an initialization is carried out in step 100; whether or not the vehicle is running is detected by a motor rotational speed sensor 67 (102); if running, step 104 is carried; and if not running, whether or not the vehicle is prepared for staring (starting of the motor 66) is determined according to various vehicle conditions (103); if not prepared for starting, step 105 is carried to set the set-torque to 0, all the switches (IGBT) of the inverter 62 are turned off and the next step follows.

On the other hand, if it is determined that the vehicle is prepared for starting, step 104 is carried where the running condition and the drive operations are detected. That is, the drive operation such as depressed amount of the accelerator pedal and the brake pedal, and running conditions such as the motor rotational speed and the vehicle speed.

In the next step 108, the set-torque is determined in the step 106 and a real-angular-velocity $\omega$ is introduced into an equation or a map installed in the apparatus for vector-processing to obtain the set-current-signals (instantaneous values) iu and iw. That is, the instantaneous values of the set-current-signals iu and iw, which are sinusoidal wave functions to provide necessary set-torques at a motor angular-velocity $\omega$, are obtained.

In addition, an amplitude A of the set-current-signals iu and iw and a set-frequency fo (or set-angular-velocity $\omega o=2\pi fo$) are determined by substitution of the set-torques determined in the step 106 and the real-angular-velocity $\omega$ into the equation or the map, thereby determining the set-current signals iu and iw which are the sinusoidal wave function. The present phase angle, which is given by adding an advancing angle of the present phase angle relative to the phase angle given at the last time to the same, and the present phase angle is substituted in the sinusoidal wave function, which are the set-current-signals iu and iw, to obtain the instantaneous values of the set-current-signals iu and iw (which are the sinusoidal wave functions) generated respectively at the interval of an angle 120°. Subsequently, in the next step 110, they are written into a set-current-signal-output-port of the ECU's output interface (not shown).

Of course, the three-phase-modulation is well-known and has various types, anyone of which is available to this embodiment. For instance, in the vector-processing in the step 108, the set-current-signals iu and iw (which are the sinusoidal wave functions having the fixed amplitude A and set-angular-velocity) are determined. The instantaneous values of the set-current-signals, iu and iw (which are the sinusoidal wave functions) are calculated and outputted during each divided period obtained by dividing the period To (which is a reciprocal number of the set-angular-velocity $\omega o$) by an integer N (no less than 10), in other words, each time after a phase angle (which is given by dividing one-cycle-period phase angle $2\Pi$ by the integer N) has passed. In this calculation, the time when the instantaneous value of the last set-current-signal iu becomes 0 is determined as a position where the phase angle is 0, from where the respective phase angles are determined during each above divided period.

In addition, the set-angular-velocity $\omega o$ is determined from the set-torque as follows. Since the set-slip-ratio so (=($\omega o-\omega$)/$\omega o=\Delta\omega/\omega o$) of the induction motor is a function of the set-torque, the set-slip-ratio so is determined based on the set-torque. The set-angular-velocity $\omega o$ and the corresponding set-frequency fo are determined based on the set-slip-ratio so and the real-angular-velocity $\omega$ of the motor.

In the next step 110, the set-current-signals iu and iw, which are calculated in the step 108, are output. The set-current-signal-output-port (not shown) holds the instantaneous values of the set-current-signals iu and iw, D-A converts and sends them to the circuits 11, 13 and 50.

An interruption routine, which is a special feature of this embodiment for the two-phase-modulation, is described with reference to FIG. 12 next.

The interruption routine is carried after the expiration of the operation of a timer installed in the controller 10. It is also carried a prescribed period after the power switch is turned on.

In the next step 202, an interruption-time-setting-subroutine is carried, which is explained next.

In this embodiment, the interruption is carried each time after a period, which is given by dividing a slip cycle Ts (which is a reciprocal number of a slip frequency $\Delta f=fs=fo-f$) by an integer N (N>8), has passed. Here, f is the frequency of the motor rotation.

In the step 202, the set-slip-ratio so given in the step 108 just before is multiplied by the frequency fo of the set-current-signal iu, iv and iw to obtain a set-frequency fs=fo−f=so×fo, and obtain the slip cycle Ts (set value) which is the reciprocal number of the absolute value thereof. The next interruption timing is determined the time after a time Ts/N has passed from the start of the last interruption, and is set to the timer (not shown) installed in the controller 10. The timer is started at the same time.

In the next step 203, whether or not the two-phase-modulation is carried out is determined, and if it is carried out, the operation bypasses steps 204, 206, 210 and 212 and jumps to a step 216 where whether or not the changeover from the three-phase-modulation to the two-phase-modulation is carried is determined. If it is not carried, the operation goes to a step 204. In the step 204, whether the set-slip-ratio is positive or not is detected. If not, the motor condition is determined as the regeneration running (power generation) appropriate for the three-phase-modulation and an output counter (not shown) which is described later is cleared (in a step 208) and a step 216 is started.

On the other hand, if the set-slip-ratio so is positive in the step 204; the motor condition is determined as the power running (motor drive) operation appropriate for the two-phase-modulation and an output cycle counter (not shown) counts up just 1 (in a step 206); then, the cumulative counted number is checked whether or not it is no less than an integer n (in a step 210); if it is less than n, a step 216 follows; if not, it is determined that n×Tx period has passed after the set-slip-ratio so changed from the negative to the positive, and the changeover to the two-phase-modulation is commanded to the modulation switch 20 to carry the two-phase-modulation. The interruption cycle Tx is equal to the above Ts/N.

That is, even if the set-torque becomes 0 (if the set-slip-ratio so becomes 0) when the changeover from the electricity generation to the motor drive is carried out, the real torque of the motor 66 becomes 0 after a considerable time owing to the response time of the motor 66.

In this embodiment, as explained with reference to the above flow charts, since the three-phase-modulation changes to the two-phase-modulation n×Tx period after the set-slip-ratio changes from the negative to the positive, the mode of the modulation can be changed nearly when the real torque becomes 0 or when the regeneration running condition is changed to the power running condition. As a result, distortion of the current wave due to the above changeover is decreased and fluctuation of the real torque caused thereby can be significantly reduced, and also the system efficiency is improved by the two-phase-modulation.

After the step 212, a step 216 follows.

In the step 216, whether or not the two-phase-modulation may be changed over to the three-phase-modulation is determined. That is, whether or not the set-torque (or set-slip-ratio so) changes from the negative to the positive (from the electricity generation to the motor drive, or from the advancing phase of the slip ratio to the retarding phase) is checked in the step 106, or in the step 204 and the determination is made in the step 216 according to the above results. When it is detected that the set-torque (or set-slip-ratio so) has changed from the negative to the positive, a step 218 follows where the modulation switch 20 is commanded to change over to the three-phase-modulation, otherwise the next step returns to the main routine.

The step 218 may be carried without the step 216 if it is determined in the step 106 or 204 that the set-torque (or the set-slip-ratio) changes from the positive to the negative.

The time-lag-setting adopted in this embodiment has the following features. That is, when the set-torque changes in a stepwise, the rise-up time of the real detected torque is changed by the changed set-torque. When the set-torque is significantly large, the slip frequency cycle is short and the time lag is small. On the other hand when the set-torque is small, the slip frequency cycle is long and the time lag is significant. According to this embodiment, since the time lag is set on the basis of the slip frequency cycle, variations of the rise-up time of the output torque may be automatically controlled.

A second embodiment has a time-lag-setting different from that of the first embodiment, which is described with reference to FIG. 1 next.

In this embodiment, the next interruption timing is calculated so that the interruption is carried each time after a period which is obtained by dividing a cycle To (which is a reciprocal number of the frequency fo of the set-current-signals iu and iw obtained in the step 108) by an integer N (N>1).

When the number of the interruption times is found to be within n (e.g. n is more than 10) in a step 210, the output cycle counter commands changeover to the two-phase-modulation (in the step 212). As a result, the time lag becomes n×To/N; if the frequency of the set-current-signals iu and iw is high (high rotational speed), the time lag is short; if the frequency fo is low (low rotational speed), the time lag becomes long. Thus, the same effect as in the first embodiment can be achieved.

As a variation of the above embodiment, the next interruption timing may be calculated in the step 202 so that the interruption is carried each time after a period which is obtained by dividing the real cycle T (which is a reciprocal number of the real frequency f calculated from the rotation of the motor 66) by an integer N (N>10).

As another variation of the above embodiment, the interruption timing may be set in the step 202 to a fixed period. In this case, the changeover from the three-phase-modulation to the two-phase-modulation is carried each fixed period after the set-torque changes from the negative to the positive.

A third embodiment is described with reference to FIG. 12 and FIG. 13 next.

Figure 12:
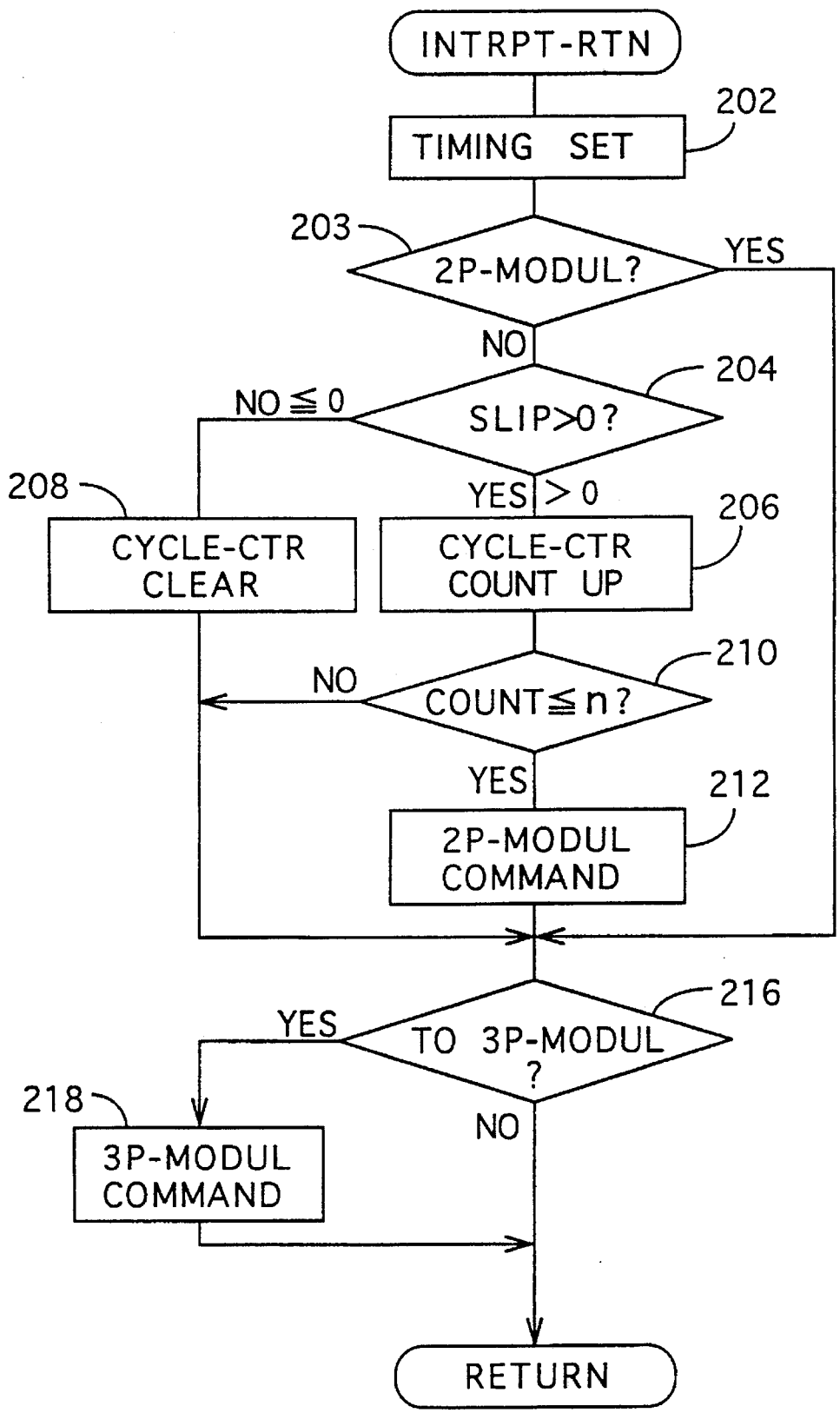
FIG. 12 is a flow chart showing the control steps of changeover between the three-phase-modulation and the two-phase-modulation by the controller shown in FIG. 1.

This embodiment omits the steps 206, 208 and 210 and changes the changeover condition in the step 204 shown in FIG. 12.

Figure 13:
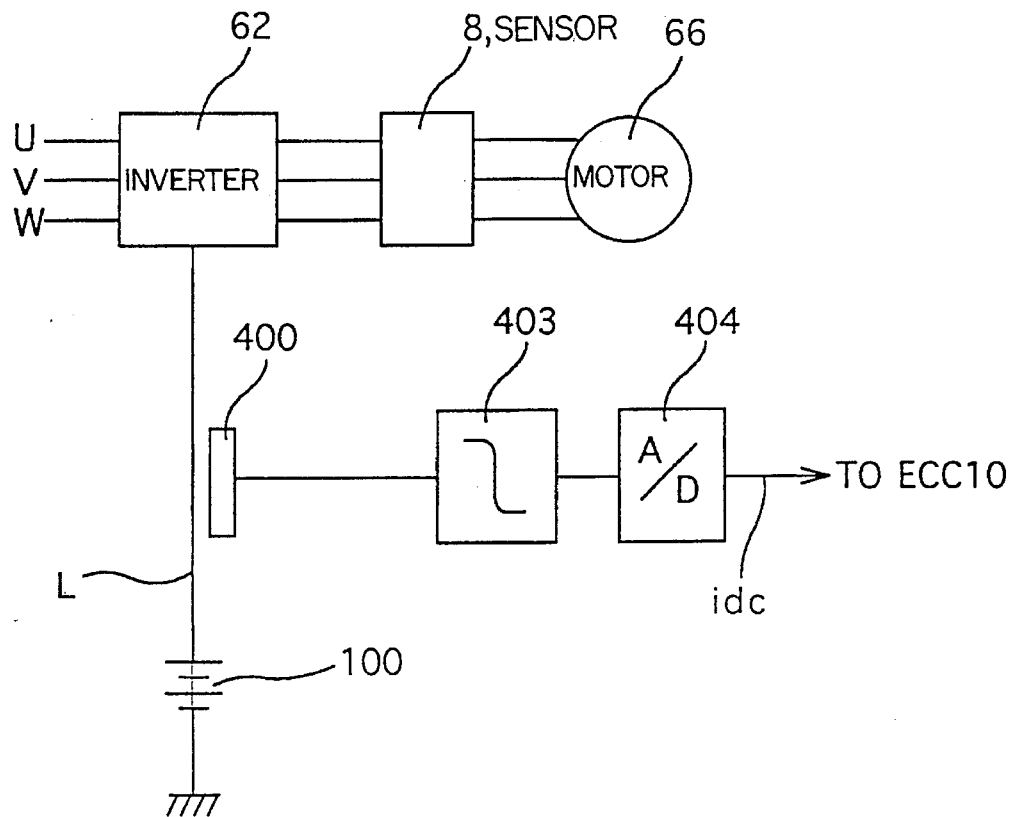
FIG. 13 is a block diagram showing a battery current detecting circuit for use in a fourth embodiment.
Figure 14:
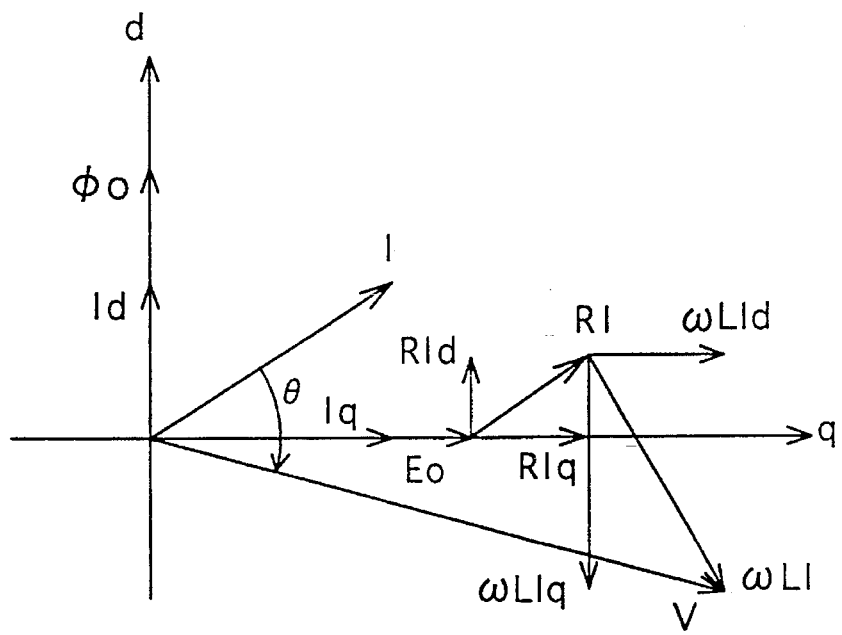
FIG. 14 is a vector diagram showing the conventional relationship of the phase angle between a phase voltage of a three-phase induction motor in the power running condition and a detected phase current in the d-q coordinates.
Figure 15:
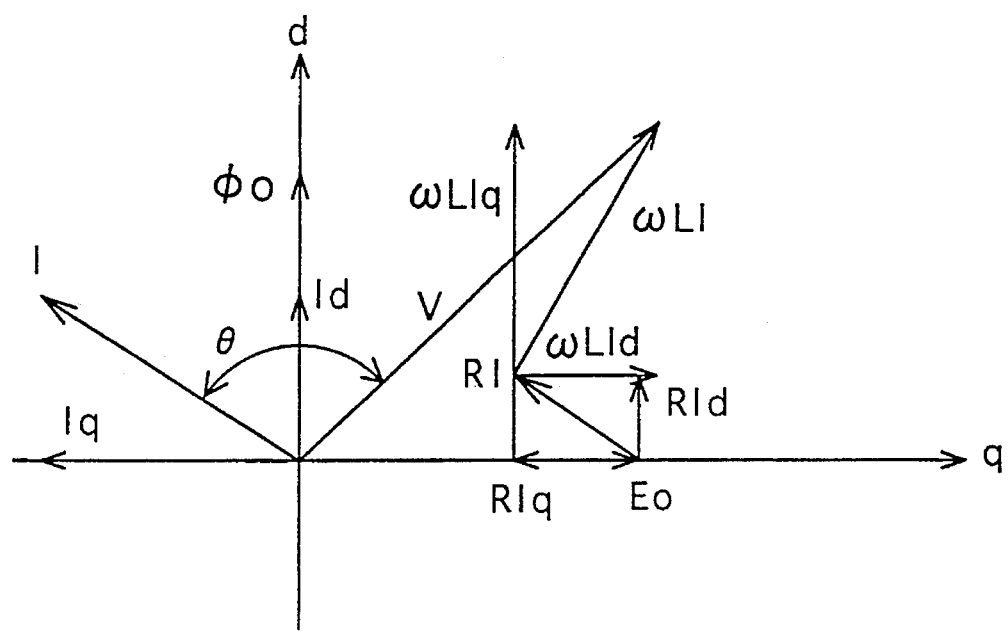
FIG. 15 is a vector diagram showing the conventional relationship of the phase angle between a phase voltage of a three-phase induction motor in the regeneration running and a detected phase current in the d-q coordinates.

As shown in FIG. 13, a current sensor 400 is disposed in a line L which supplies electric current from a battery 100 to a three-phase inverter 62 so that the current i flowing from the battery to the three-phase inverter 62 is detected and sent to an ECU 10 through a low-pass filter 403 which eliminates ripple noises and A-D converter 404 which converts the current i into a direct-current signal idc.

Accordingly, whether or not the direct-current signal idc becomes greater than or close to an exciting current (at no load) is detected in the step 204. If it is, the step 212 follows and the changeover from the three-phase-modulation to the two-phase-moderation is commanded.

In the foregoing discussion of the present invention, the invention has been described with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than a restrictive, sense.

What is claimed is:

1. An inverter control apparatus for controlling a three-phase inverter which operates a three-phase induction motor under a power running condition or a regeneration running condition according to a motor control signal, said inverter control apparatus comprising:

a current-signal generator for generating a set current signal according to said motor control signal;

a current detector for detecting a real current and for generating a real current signal;

a deviation detector for detecting a deviation between a set-current and said real current based on said set current signal and said real current signal;

first means for providing a three-phase modulation control of said motor in which a modulation percentage of said phase voltage of said inverter is applied to each phase-winding of said motor and for providing a two-phase modulation control of said motor in which a fixed modulation percentage of one phase-voltage of said inverter is applied to one-phase-winding of said motor during a fixed period;

second means for causing said first means to provide said two-phase modulation control if said motor is operating under said power running condition and to provide said three-phase modulation control if said motor is operating under said regenerating running condition; and a wave-signal generator for controlling said inverter according to an output of said second means and said detected deviation thereby causing a first voltage wave for said two-phase modulation control to be applied to said phase winding of said motor if said two-phase modulation control is performed and causing a second voltage wave for said three-phase modulation control to be applied to said phase windings of said motor if said three-phase modulation control is performed.

2. An inverter control apparatus according to claim 1, wherein said second means comprises means for detecting said power running condition and said regeneration running condition.

3. An inverter control apparatus according to claim 1, wherein said second means comprises means for causing said wave signal generator to change from said second voltage wave for said three-phase modulation control to said first voltage wave for said two-phase modulation control at a prescribed time after said second means determines that said two-phase modulation is to be provided by said first means.

4. An inverter control apparatus according to claim 1, wherein said second means comprises means for detecting a set torque and means for causing said wave signal generator to change from said second voltage wave for said three-phase modulation control to said first voltage wave for said two-phase modulation control at a prescribed time after said set torque changes from a negative value to a positive value.

5. An inverter control apparatus according to claim 1, wherein said second means comprises means for detecting a set slip ratio and means for causing said wave signal generator to change from said second voltage wave for said three-phase modulation control to said first voltage wave for said two-phase modulation control at a prescribed time after said set slip ratio changes from a negative value to a positive value.

6. An inverter control apparatus according to claim 1, wherein said second means comprises means for detecting a change over of said motor running condition according to said set current signal and means for causing said wave signal generator to change from said second voltage wave for said three-phase modulation control to said first voltage wave for said two-phase modulation control at a prescribed time after said regeneration running condition is changed over to said power running condition.

7. An inverter control apparatus according to claim 1, wherein said second means for determining a modulation control comprises means for detecting torque of said motor and means for causing said wave signal generator to change from said second voltage wave for said three-phase modulation control to said first voltage wave for said two-phase modulation control at a prescribed time after said torque changes from a negative value to a positive value.

8. An inverter control apparatus according to claim 1, wherein said second means comprises means for detecting a battery charging current of a battery and means for causing said wave signal generator to change from said second voltage wave for said three-phase modulation control to said first voltage wave for said two-phase modulation control at a prescribed time after said charging current changes from a charging current to a discharging current.

9. An inverter control apparatus according to claim 1, wherein said wave-signal generator comprises means for adding or subtracting a prescribed offset voltage, which varies according to said detected deviation, to or from said phase-voltage whose modulation percentage is fixed.

10. An inverter control apparatus according to claim 1, wherein said wave-signal generator comprises means for generating a PWM carrier wave, means for comparing said PWM carrier wave and said deviation, and means for adding or subtracting a prescribed offset voltage to or from said carrier wave for a one-phase voltage that is fixed when said two-phase modulation control is carried out, thereby fixing a modulation percentage of said one phase-voltage to 100% and also for adding or subtracting a prescribed offset voltage to or from said PWM carrier wave for phase voltages other than said fixed one-phase voltage.

* * * * *